US012331709B2

United States Patent
Scandurra et al.

(10) Patent No.: US 12,331,709 B2
(45) Date of Patent: Jun. 17, 2025

(54) ROAD VEHICLE PROVIDED WITH AN ELECTRONIC DC-DC POWER CONVERTER AND CORRESPONDING CONTROL METHOD

(71) Applicant: FERRARI S.P.A., Modena (IT)

(72) Inventors: Antonio Scandurra, Modena (IT); Daniele Genova, Modena (IT); Matias Troncoso, Modena (IT); Giovanni Sartoni, Modena (IT); Stefano Lugini, Modena (IT); Roberto Betrò, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/463,666

(22) Filed: Sep. 8, 2023

(65) Prior Publication Data

US 2024/0084772 A1 Mar. 14, 2024

(30) Foreign Application Priority Data

Sep. 12, 2022 (IT) .......................... 102022000018462

(51) Int. Cl.
*F02N 11/08* (2006.01)
*B60L 15/20* (2006.01)
(Continued)

(52) U.S. Cl.
CPC .......... *F02N 11/0811* (2013.01); *B60L 50/14* (2019.02); *B60L 58/21* (2019.02);
(Continued)

(58) Field of Classification Search
CPC .............. F02N 11/0811; F02N 11/0837; F02N 11/0866; F02N 2011/0888;
(Continued)

(56) References Cited

U.S. PATENT DOCUMENTS

| | | | | | |
|---|---|---|---|---|---|
| 5,316,868 | A | * | 5/1994 | Dougherty | ............ H02J 7/0063 |
| | | | | | 429/62 |
| 2001/0049571 | A1 | * | 12/2001 | Shimizu | .................. B60L 3/003 |
| | | | | | 903/905 |

(Continued)

FOREIGN PATENT DOCUMENTS

| EP | 1369285 | A1 | * | 12/2003 | ............... B60K 6/48 |
|---|---|---|---|---|---|
| EP | 2065268 | A1 | | 6/2009 | |

(Continued)

OTHER PUBLICATIONS

Italian Search Report for Application No. 102022000018462, Filing Date: Sep. 12, 2022; Date of Mailing: Jan. 23, 2023, 7 pages.

(Continued)

*Primary Examiner* — John M Zaleskas
(74) *Attorney, Agent, or Firm* — CANTOR COLBURN LLP

(57) ABSTRACT

A road vehicle comprising: an internal combustion engine; an electric starter motor; a high-voltage electric circuit provided with a first storage system; a low-voltage electric circuit provided with a second storage system and directly connected to the electric starter motor; an electronic DC-DC power converter, which connects the low-voltage electric circuit and the high-voltage electric circuit to one another; and a control unit configured, in the presence of a turned-on condition of the road vehicle and when the internal combustion engine is off, to activate the electronic DC-DC power converter so as to transfer power to be at least partially supplied to the electric starter motor from the high-voltage electric circuit to the low-voltage electric circuit only in case of a cold-start condition of the internal combustion engine.

7 Claims, 3 Drawing Sheets

(51) Int. Cl.
    *B60L 50/14*     (2019.01)
    *B60L 50/61*     (2019.01)
    *B60L 58/21*     (2019.01)
    *B60W 10/06*     (2006.01)
    *B60W 10/08*     (2006.01)
    *F02N 11/06*     (2006.01)

(52) U.S. Cl.
    CPC ............ *B60W 10/06* (2013.01); *B60W 10/08* (2013.01); *F02N 11/06* (2013.01); *F02N 11/0866* (2013.01); *B60L 15/2045* (2013.01); *B60L 50/61* (2019.02); *B60W 2510/0676* (2013.01); *F02N 2011/0888* (2013.01)

(58) Field of Classification Search
    CPC ......... F02N 2200/023; F02N 2200/024; F02N 2200/064; F02N 2200/122; F02N 2300/2002; B60L 2210/10; B60L 2240/445; B60L 50/14; B60L 58/18; B60L 58/20; B60L 58/21; B60W 10/06; B60W 10/08; B60W 10/26; B60W 2510/0676; B60W 2510/246
    See application file for complete search history.

(56) References Cited

U.S. PATENT DOCUMENTS

| | | | | |
|---|---|---|---|---|
| 2003/0107352 | A1 | 6/2003 | Downer et al. | |
| 2003/0117113 | A1* | 6/2003 | Takemasa | B60L 58/10 903/903 |
| 2003/0160510 | A1* | 8/2003 | Mizutani | F02N 11/14 307/10.1 |
| 2004/0041403 | A1* | 3/2004 | Fattic | F02N 11/0866 290/38 E |
| 2004/0099234 | A1* | 5/2004 | Tamai | B60W 20/10 123/179.3 |
| 2006/0086333 | A1* | 4/2006 | Toyoshima | F02N 19/00 701/113 |
| 2007/0113814 | A1* | 5/2007 | Tamai | B60L 58/20 290/40 C |
| 2010/0001523 | A1* | 1/2010 | Sato | B60L 3/0046 290/31 |
| 2011/0049910 | A1* | 3/2011 | Izumi | B60W 20/00 290/38 R |
| 2014/0117890 | A1* | 5/2014 | Lee | H02J 7/342 318/139 |
| 2015/0054337 | A1* | 2/2015 | Ogale | B60L 15/007 307/10.1 |
| 2015/0224984 | A1* | 8/2015 | Kees | B60W 20/16 290/34 |
| 2015/0226171 | A1* | 8/2015 | Kees | B60W 10/26 290/31 |
| 2015/0336460 | A1* | 11/2015 | Stoller | H02J 7/1423 307/10.1 |
| 2015/0360573 | A1* | 12/2015 | Cimatti | B60K 6/48 307/10.1 |
| 2016/0214503 | A1* | 7/2016 | Orita | B60L 50/66 |
| 2016/0290304 | A1* | 10/2016 | Yukawa | B60R 16/03 |
| 2017/0259803 | A1* | 9/2017 | Khafagy | B60W 10/08 |
| 2018/0202408 | A1* | 7/2018 | Majima | F02N 11/0837 |
| 2018/0340503 | A1* | 11/2018 | Kim | F02N 11/0866 |
| 2019/0184964 | A1* | 6/2019 | Murakami | B60K 6/28 |
| 2019/0184972 | A1* | 6/2019 | Kim | B60W 10/06 |
| 2019/0326772 | A1* | 10/2019 | Shields | B60L 50/10 |
| 2020/0130695 | A1* | 4/2020 | Ando | F02N 11/0862 |
| 2020/0324659 | A1* | 10/2020 | Lo Calzo | B60L 58/20 |
| 2021/0039627 | A1* | 2/2021 | Kim | B60W 10/06 |
| 2021/0063492 | A1* | 3/2021 | Chen | F02N 11/0866 |
| 2021/0171008 | A1* | 6/2021 | Jang | F02N 11/08 |
| 2022/0055499 | A1* | 2/2022 | Moriya | F02N 11/0818 |
| 2022/0065211 | A1* | 3/2022 | Asano | F02N 11/0866 |

FOREIGN PATENT DOCUMENTS

| | | | | |
|---|---|---|---|---|
| EP | 2907716 | A2 | 8/2015 | |
| EP | 3056403 | A1 | 8/2016 | |
| EP | 3754175 | A1 | 12/2020 | |
| JP | 2004116296 | A | * | 4/2004 |
| JP | 2004306844 | A | * | 11/2004 .......... F02N 11/0866 |

OTHER PUBLICATIONS

Extended European Search Report for European Patent Application No. 23195102.1; Date of Mailing Sep. 8, 2023, 8 pages.

* cited by examiner

ROAD VEHICLE PROVIDED WITH AN ELECTRONIC DC-DC POWER CONVERTER AND CORRESPONDING CONTROL METHOD

CROSS-REFERENCE TO RELATED APPLICATIONS

This patent application claims priority from Italian patent application no. 102022000018462 filed on Sep. 12, 2022, the entire disclosure of which is incorporated herein by reference.

TECHNICAL FIELD

The invention relates to a road vehicle and to a corresponding control method.

The invention finds advantageous application in a hybrid road vehicle, to which explicit reference will be made in the description below without because of this losing generality.

PRIOR ART

A hybrid vehicle comprises an internal combustion heat engine, which transmits a torque to the drive wheels by means of a drivetrain provided with a transmission, and at least one electric machine, which is electrically connected to a power storage system and is mechanically connected to the drive wheels.

The electric system of a hybrid vehicle comprises an electric circuit with a high voltage (in relative terms, it could also have a nominal voltage of mere 48 Volts) and a high power, to which the electric machine is connected; the high-voltage electric system comprises a storage device (provided with at least one pack of chemical batteries) and a two-way electronic DC-AC power converter, which, on the direct current side, is connected to the storage device and, on the alternating current side, is connected to the electric machine and fulfils the function of controlling the electric machine.

The electric system of a hybrid vehicle further comprises an electric circuit with a low voltage (having a nominal voltage of 12 Volts) and a low power, to which all auxiliary electric services (for instance, the control units, the infotainment system, the anti-theft system, the passenger compartment lighting system, the outer lights, the electric starter motor of the heat engine . . . ) are connected. Generally speaking, the low-voltage electric circuit is provided with a storage device of its own (provided with one single electric battery, which is relatively heavy and large-sized) having a high inrush current (power) needed to supply (for a few seconds) the electric starter motor of the heat engine. Furthermore, an electronic DC-DC power converter is generally provided, which connects the low-voltage electric circuit and the high-voltage electric circuit to one another in order to transfer power from the high-voltage electric circuit to the low-voltage electric circuit or even vice versa in case on-board management strategies allow for it.

In order to try and reduce the weight and the size of the low-voltage electric circuit, the storage device of the low-voltage electric circuit can be eliminated and the electric power that can be delivered by the electronic DC-DC power converter can be increased; however, with this design solution, the total weight saved turns out to be modest (while the total manufacturing costs significantly increase), as the nominal power of the electronic DC-DC power converter must increase from approximately 2 kW (needed to supply all the electrical loads during the normal running of the vehicle) to more than 10 kW (needed by the electric starter motor during the few instants in which it initiates the engine's operation)

Furthermore, when the storage device of the low-voltage electric circuit is eliminated, the electronic DC-DC power converter needs to always remain active, even when the vehicle is parked, so as to supply the necessary power to the electrical loads that always need to be powered (typically, the anti-theft system, which is always active when the vehicle is parked, and the infotainment system, which could dialogue with the owner of the vehicle from a distance or with a remote assistance centre when the vehicle is parked). As a consequence, the electronic DC-DC power converter is continuously stressed (namely, it needs to work 24/7) and, hence, it requires a more expensive designing in order to be able to stand continuously operating for an adequately long amount of time (taking into account the fact that the minimum life of a vehicle is at least ten years).

Patent application EP2065268A1 discloses solutions for a cold start of an internal combustion engine in a hybrid vehicle.

DESCRIPTION OF THE INVENTION

The object of the present invention is to provide a road vehicle and a corresponding control method, which do not suffer from the drawbacks discussed above and, at the same time, can be manufactured and carried out in a straightforward and low-cost manner.

According to the invention, there are provided a road vehicle and a corresponding control method as claimed in the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
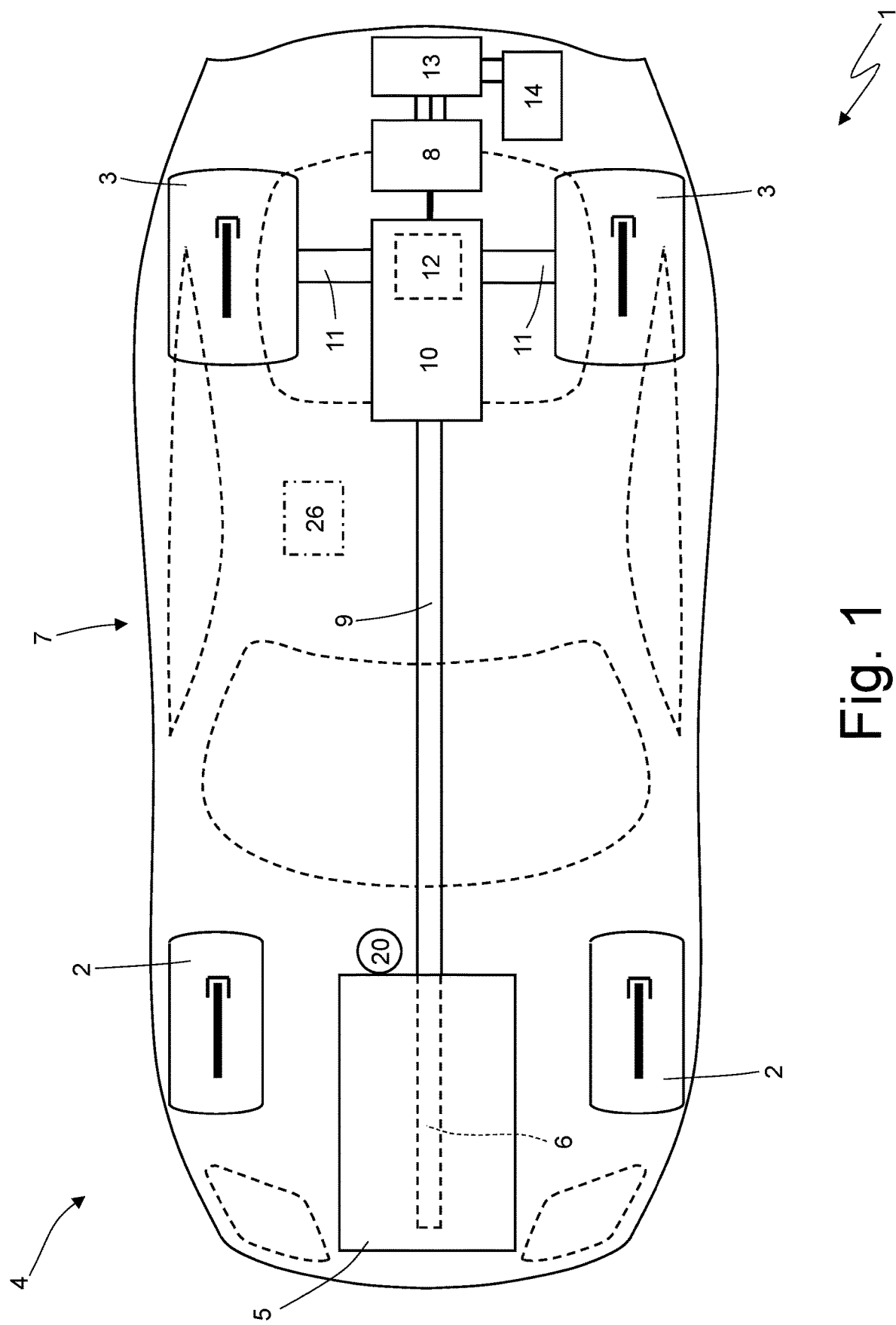
FIG. 1 is a schematic plan view of a hybrid road vehicle according to the invention.

In FIG. 1, number 1 indicates, as a whole, a hybrid road vehicle, which is provided with two front wheels 2 and two rear drive wheels 3, which receive the torque from a hybrid powertrain system 4.

The hybrid powertrain system 4 comprises an internal combustion engine 5, which is arranged in a front position and is provided with a crankshaft 6, a drivetrain 7, which transmits the torque generated by the internal combustion engine 5 to the rear drive wheels 3, and an electric machine 8, which is mechanically connected to the drivetrain 7 and is reversible (i.e. it can work both as an electric motor, absorbing electrical energy and generating a mechanical torque, and as an electric generator, absorbing mechanical energy and generating electrical energy).

The drivetrain 7 comprises a drive shaft 9, which, on one side, is angularly integral to the crankshaft 6 and, on the other side, is mechanically connected to a transmission 10, which is arranged in a rear position and transmits the motion to the rear drive wheels 3 by means of two axle shafts 11, which receive the motion from a differential 12.

The electric machine 8 is mechanically connected to the transmission 10 and is controlled by an AC/DC electronic power converter 13 (namely, an "inverter"), which is connected to a power storage system 14 provided with chemical batteries. In this application the DC-AC electronic power converter 13 is a two-way power converter and comprises a direct current side, which is connected to the storage system 14, and a three-phase alternating current side, which is connected to the electric machine 8.

Figure 2:
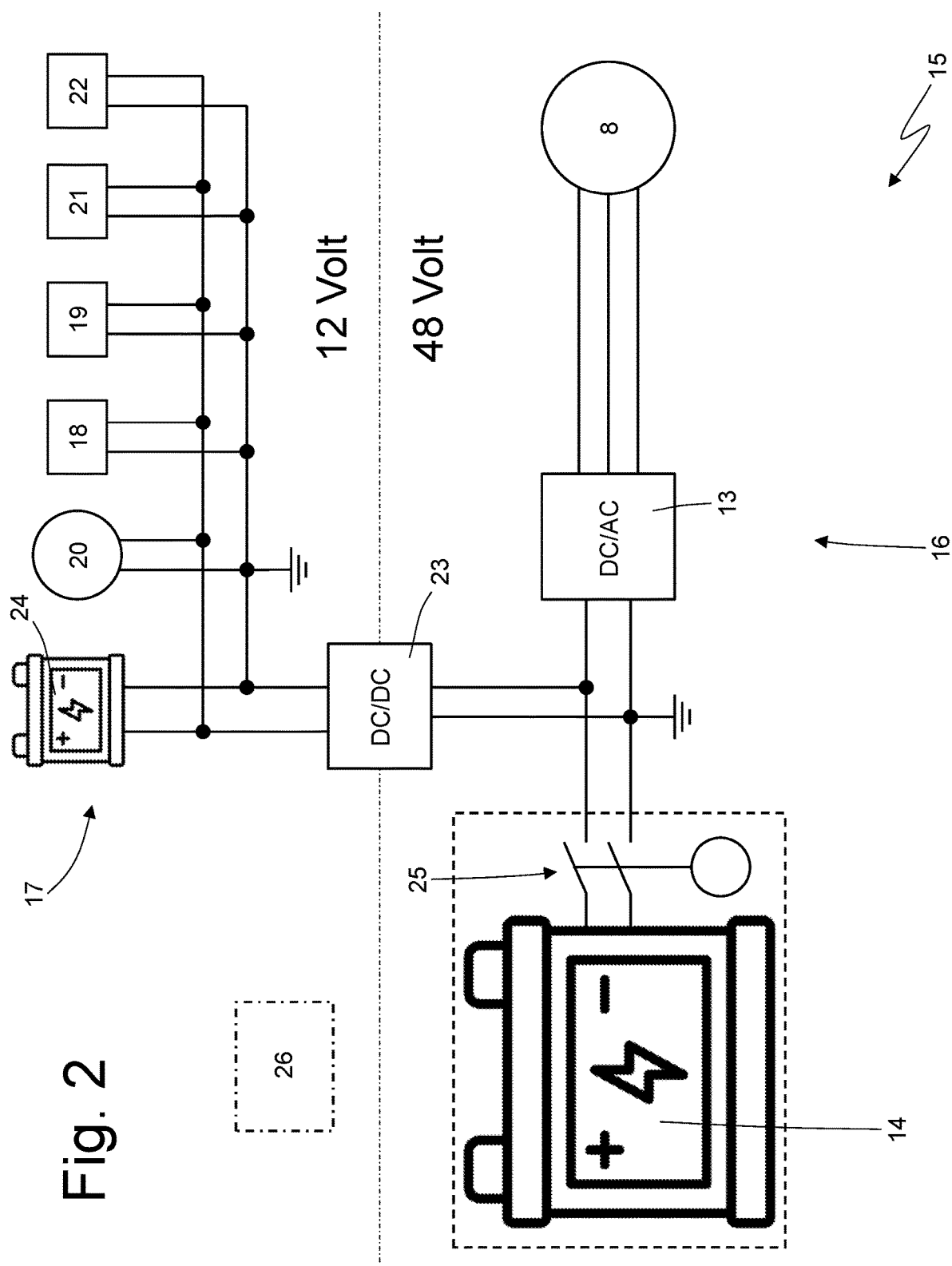
FIG. 2 is a schematic view of an electric system of the road vehicle of FIG. 1.

According to FIG. 2, the road vehicle 1 is provided with an electric system 15, which comprises an electric circuit 16 with a high voltage (in relative terms) and a high power having a nominal voltage of 48 Volts and an electric circuit 17 with a low voltage and a low power having a nominal voltage of 12 Volts. It should be pointed out that the electric circuit 16 is defined "high-voltage" circuit because it has a nominal voltage (48 Volts) which is greater than the nominal voltage (12 Volts) of the electric circuit 17, namely the definition "high voltage" should be interpreted as concerning the sole electric system 15 and with reference to the electric circuit 17 having a nominal voltage of 12 Volts.

The high-voltage electric circuit 16 comprises the storage system 14 and the AC/DC electronic power converter 13, which, on one side, is connected to the storage system 14 and, on the opposite side, is connected to the electric machine 8 (namely, to the stator windings of the electric machine 8).

The low-voltage electric circuit 17 comprises a plurality of electrical loads, each absorbing power for its own operation. In particular, the electrical loads comprise (high-priority) continuous electrical loads, which have a modest absorption of power and must be constantly supplied with power regardless of the use of the road vehicle 1 (namely, they must constantly be supplied with power even when the road vehicle 1 is parked) and (low-priority) occasional electrical loads, which must be supplied with power only when the road vehicle 1 is being used and, often, only for limited amounts of time.

The (high-priority) continuous electrical loads comprise, for example, an alarm system 18 and an infotainment system 19; obviously, further continuous electrical loads other than the ones mentioned above can be provided, such as, for example, electronic control units which, in case of interruption of the supply of power, generate, when they are restarted, an error message (namely, those electronic control units which, despite being capable of operating in standby and low-energy mode, always need to be powered with continuity or otherwise generate errors when they are restarted). On the other hand, the occasional electrical loads comprise, for example, an electric starter motor 20 (which obviously has the same nominal voltage as the low-voltage electric circuit 17, since it is directly connected to the low-voltage electric circuit 17), a passenger compartment lighting system 21, the outer lights 22, an air conditioning system (not shown), the different electronic control units (not shown); obviously, further occasional electrical loads other than the ones mentioned above can be provided.

The electric system 15 comprises a electronic DC-DC power converter 23, which connects the low-voltage electric circuit 17 and the high-voltage electric circuit 16 to one another in order to transfer power from the high-voltage electric circuit 16 to the low-voltage electric circuit 17 (or even vice versa in case on-board management strategies allow for it). The low-voltage electric circuit 17 comprises a power storage system 24 of its own, which is external to (independent of) the electronic DC-DC power converter 23. The storage system 24 obviously also has the same nominal voltage as the low-voltage electric circuit 17, since it is directly connected to the low-voltage electric circuit 17 and, hence, the storage system 24 has the same nominal voltage as the electric starter motor 20. In other words, the storage system 24 is directly connected to the electric starter motor 20 without the interposition of any kind of conversion device and is designed to directly supply power to the electric starter motor 20.

According to a preferred embodiment, the storage system 14 comprises an electrically operated protection contactor 25 (namely, which can remotely be controlled through an electric actuator), which is arranged in series to the storage system 14 of the high-voltage electric circuit 16. The protection contactor 25 is normally kept open and is closed only when power has to be exchanged with the storage system 14.

A control unit 26 is provided, which, among other things, controls the electronic DC-DC power converter 23 and the protection contactor 25.

The control unit 26 is configured to detect a turned-on condition of the road vehicle 1 (namely, when the driver "turns on" the road vehicle 1, thus making it ready for the start of the internal combustion engine 5, by turning an ignition key or by pressing a start button).

Furthermore, the control unit 26 is configured to detect a cold-start condition of the internal combustion engine 5, namely a condition in which the internal combustion engine 5 is "cold" and turned off (hence, is in the most difficult conditions for it to be started). For example, the control unit 26 is configured to determine a temperature of a cooling liquid of the internal combustion engine 5 and to detect a cold-start condition of the internal combustion engine 5 when the temperature of the cooling liquid is below a predetermined threshold value.

The control unit 26 is configured, when the internal combustion engine 5 is off, to keep the electronic DC-DC power converter 23 deactivated so as not to transfer power to be at least partially supplied to the electric starter motor 20 from the high-voltage electric circuit 16 to the low-voltage electric circuit 17 in the absence of the cold-start condition of the internal combustion engine 5. In other words, when the road vehicle 1 is turned on (the so-called "KEY ON" condition) and the internal combustion engine 5 is "hot" (i.e. in the absence of the cold-start condition of the internal combustion engine 5), the control unit 26 keeps the electronic DC-DC power converter 23 deactivated so as not to transfer power from the high-voltage electric circuit 16 to the low-voltage electric circuit 17. Indeed, when the internal combustion engine 5 is "hot" (i.e. in the absence of the cold-start condition of the internal combustion engine 5), the storage system 24 of the low-voltage electric circuit 17 is perfectly capable of supplying the electric starter motor 20 with all the electrical power (energy) needed for a quick and safe start of the internal combustion engine 5.

The control unit 26 is configured, when the internal combustion engine 5 is off, to activate the electronic DC-DC power converter 23 so as to transfer power to be at least partially supplied to the electric starter motor 20 from the high-voltage electric circuit 16 to the low-voltage electric circuit 17 in case of the cold-start condition of the internal combustion engine 5. In other words, when the road vehicle 1 is turned on (the so-called "KEY ON" condition) and the internal combustion engine 5 is "cold" (i.e. in case of the cold-start condition of the internal combustion engine 5), the control unit 26 activates the electronic DC-DC power converter 23 so as to transfer power to be at least partially supplied to the electric starter motor 20 from the high-voltage electric circuit 16 to the low-voltage electric circuit 17. Indeed, when the internal combustion engine 5 is "cold" (i.e. in case of the cold-start condition of the internal combustion engine 5), the storage system 24 of the low-voltage electric circuit 17 could not be capable of supplying the electric starter motor 20 with all the electrical power (energy) needed for a quick and safe start of the internal combustion engine 5; therefore, the storage system 14 of the high-voltage electric circuit 16 "helps" the storage system 24 of the low-voltage electric circuit 17 by supplying (through the electronic DC-DC power converter 23) additional electrical power (energy) to be at least partially supplied to the electric starter motor 20, which ensures a quick and safe start of the internal combustion engine 5.

According to a preferred embodiment, the control unit 26 is configured to determine a level of charge of the storage system 14 and, hence, to activate the electronic DC-DC power converter 23 in case of a cold-start condition of the internal combustion engine 5 only if the level of charge of the storage system 14 exceeds a predetermined threshold value. In other words, in case of a cold-start condition of the internal combustion engine 5, the storage system 14 of the high-voltage electric circuit 16 "helps" the storage system 24 of the low-voltage electric circuit 17 only if the storage system 14 has an appropriate (namely, not too high) level of charge.

According to a preferred embodiment, the control unit 26 is configured to deactivate the electronic DC-DC power converter 23 as soon as the internal combustion engine 5 is started. In other words, as soon as the internal combustion engine 5 is started, no additional electrical power (energy) has to be supplied any longer to the low-voltage electric circuit 17 and, hence, the electronic DC-DC power converter 23 is deactivated so as not to further discharge, with no actual need, the storage system 14 of the high-voltage electric circuit 16.

According to a preferred embodiment, the control unit 26 is configured to activate the electronic DC-DC power converter 23 in case of a cold-start condition of the internal combustion engine 5, only in the moment in which a start of the internal combustion engine 5 a is actually activated (requested, started). In other words, the electronic DC-DC power converter 23 supplies electrical power (energy) to the low-voltage electric circuit 17 only when the electric starter motor 20 is absorbing (or starts to absorb) electrical power (energy).

According to an alternative embodiment, the control unit 26 is configured to activate the electronic DC-DC power converter 23 in case of a cold-start condition of the internal combustion engine 5 a as soon as a turned-on condition of the road vehicle 1 is detected. In other words, the electronic DC-DC power converter 23 supplies electrical power (energy) to the low-voltage electric circuit 17 even before the electric starter motor 20 starts to absorb electrical power (energy). In this case, the control unit 26 is configured to deactivate the electronic DC-DC power converter 23 after a predetermined amount of time (for instance, ten seconds) has elapsed since the road vehicle 1 was turned on without requests for a start of the internal combustion engine 5.

According to a preferred embodiment, the control unit 26 is configured to close the protection contactor 25 of the storage system 14 in case of a cold-start condition of the internal combustion engine 5 as soon as a turned-on condition of the road vehicle 1 is detected.

According to a preferred embodiment, the control unit 26 is configured to open the protection contactor 25 of the storage system 14 after a predetermined amount of time (for instance, 10-30 seconds) has elapsed since the protection contactor 25 was closed without requests for a start of the internal combustion engine 5.

In the embodiment shown in FIG. 1, the high-voltage electric circuit 16 comprises the electric machine 8, which can also serve as generator, and, therefore, is capable of autonomously charging (namely, independently of the low-voltage electric circuit 17) its own storage system 14; in this embodiment, the high-voltage electric circuit 16 generally regularly (continuously) supplies power to the low-voltage electric circuit 17 through the electronic DC-DC power converter 23.

Owing to the above it is evident that, in the absence of the cold-start condition of the internal combustion engine 5, the power needed for the electric started motor 20 is only and exclusively supplied by the storage system 24 of the low-voltage electric circuit 17 (hence, the high-voltage electric circuit 16 does not supply power to the electric starter motor 20 through the electronic DC-DC power converter 23).

Figure 3:
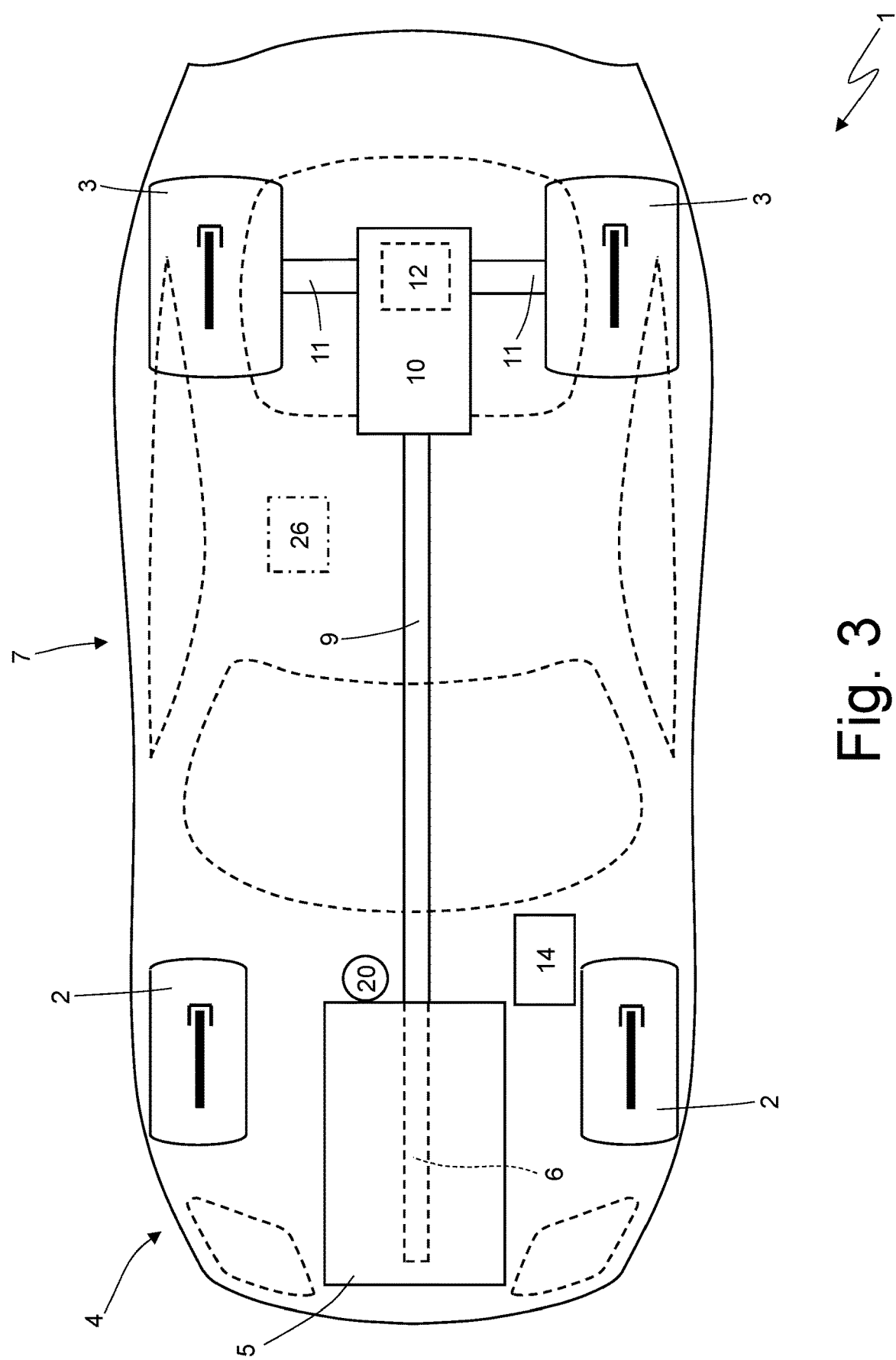
FIG. 3 is a schematic plan view of a road vehicle with an exclusively heat-related drive according to the invention.

In the alternative embodiment shown in FIG. 3, the road vehicle 1 is not a hybrid vehicle, the high-voltage electric circuit 16 does not comprise the electric machine 8, which can also serve as generator, and, therefore, is not capable of autonomously charging (namely, independently of the low-voltage electric circuit 17) its own storage system 14; in this embodiment, the low-voltage electric circuit 17 (obviously connected to an electric generator operated by the crankshaft 6 of the internal combustion engine 5) regularly (continuously) supplies power to the high-voltage electric circuit 16 through the electronic DC-DC power converter 23. In the embodiment shown in FIG. 3, the high-voltage electric circuit 16 is used, for example, to continuously power relevant electrical loads, such as, for example, electric actuators of active suspensions.

The nominal voltage of the low-voltage electric circuit 17 generally always is 12 Volts, since this value is the only worldwide standard for automotive applications; on the other hand, the nominal voltage of the high-voltage electric circuit 16 could be different from 48 Volts (generally greater than 48 Volts, up to different hundreds of Volts or even a thousand Volts).

The embodiments described herein can be combined with one another, without for this reason going beyond the scope of protection of the invention.

The road vehicle 1 described above has numerous advantages.

First of all, in the road vehicle 1 disclosed above, the dimensions and the weight of the storage system 24 of the low-voltage electric circuit 17 can significantly be reduced; this result is obtained thanks to the possibility of downsizing the storage system 24 of the low-voltage electric circuit 17 because, in case of need (namely, in case of a cold start of the internal combustion engine 5), the storage system 24 of the low-voltage electric circuit 17 is "helped" by the storage system 14 of the high-voltage electric circuit 16 through the electronic DC-DC power converter 23.

In this way, in the road vehicle 1 disclosed above, a quick and safe start of the internal combustion engine 5 can always be performed, even in case of a cold start.

In other words, in the road vehicle disclosed above 1, the traditional low-voltage electric circuit 17 is integrated with the storage system 14 of the high-voltage electric circuit 16 so as to have them work together in order to obtain an optimization of the management of the electrical power, which always ensures ideal performances, even in case of downsizing of the storage system 24 of the low-voltage electric circuit 17. Indeed, in case of a cold start of the internal combustion engine 5, the storage system 14 of the electric circuit 16 supplies additional electrical power (energy) to the electric starter motor 20 and this additional electrical power (energy) leads to a reduction of the start time (which also translates into an improvement of the start noise).

Finally, the electric system 15 described above features relatively reduced costs and a relatively small complexity, since it entirely consists of commercial components.

LIST OF THE REFERENCE NUMBERS OF THE FIGURES 1 road vehicle
2 front wheels
3 rear wheels
4 powertrain system
5 internal combustion engine
6 crankshaft
7 drivetrain
8 electric machine
9 drive shaft
10 mechanical transmission
11 axle shafts
12 differential
13 AC/DC electronic power converter
14 storage system
15 electric system
16 high-voltage electric circuit
17 low-voltage electric circuit
18 alarm system
19 infotainment system
20 electric starter motor
21 passenger compartment lighting system
22 outer lights
23 DC/DC electronic power converter
24 storage system
25 protection contactor
26 control unit

The invention claimed is:

1. A road vehicle (1) comprising:
an internal combustion engine (5);
an electric starter motor (20), which is coupled to the internal combustion engine (5) and can be operated to start the internal combustion engine (5);
a high-voltage electric circuit (16) provided with a first storage system (14);
a low-voltage electric circuit (17) provided with a second storage system (24), which has the same nominal voltage as the electric starter motor (20) and is directly connected to the electric starter motor (20) to directly supply power to the electric starter motor (20) without the interposition of any conversion device;
an electronic DC-DC power converter (23), which connects the low-voltage electric circuit (17) and the high-voltage electric circuit (16) to one another to transfer power from the high-voltage electric circuit (16) to the low-voltage electric circuit (17); and
a control unit (26) configured to:
  detect a turned-on condition of the road vehicle (1) when a driver turns on the road vehicle (1), thus making the road vehicle (1) ready for the start of the internal combustion engine (5), by turning an ignition key or by pressing a start button;
  detect a cold-start condition of the internal combustion engine (5) when a temperaure of a cooling liquid in the internal combusion engine is below a predetermined threshold; and
  transfer power from the high-voltage electric circuit (16) to the low-voltage electric circuit (17) using the electronic DC-DC power converter (23) and from the low-voltage electric circuit (17) to the electric starter motor (20) upon detection of the turned-on condition of the road vehicle (1) when the internal combustion engine (5) is off and when the cold-start condition of the internal combustion engine (5) is detected;
wherein, when the cooling liquid in the internal combusions engine is greater than the predetermined threshold value, the cold-start condition of the internal combustion engine (5) is not detected, and the power to be supplied to the electric starter motor (20) is exclusively provided by the second storage system (24);
wherein the control unit (26) is configured to activate the electronic DC-DC power converter (23) prior to cranking of the internal combustion engine when the cold-start condition of the internal combustion engine (5) is detected, as soon as the turned-on condition of the road vehicle (1) is detected so that the electronic DC-DC power converter (23) supplies electrical power to the low-voltage electric circuit (17) even before the electric starter motor (20) starts to absorb electrical power; and
wherein the control unit (26) is configured to deactivate the electronic DC-DC power converter (23) after a predetermined amount of time has elapsed since the road vehicle (1) was turned on and the electronic DC-DC power converter (23) was activated without requests for a start of the internal combustion engine (5).

2. The road vehicle (1) according to claim 1, wherein the control unit (26) is configured, in the presence of the turned-on condition of the road vehicle (1) and when the internal combustion engine (5) is off, to keep the electronic DC-DC power converter (23) deactivated so as not to transfer power to the electric starter motor (20) from the high-voltage electric circuit (16) to the low-voltage electric circuit (17) in the absence of the cold-start condition of the internal combustion engine (5).

3. The road vehicle (1) according to claim 1, wherein the control unit (26) is configured to determine a level of charge of the first storage system (14) and to activate the electronic DC-DC power converter (23) in case of the cold-start condition of the internal combustion engine (5), only if the level of charge of the first storage system (14) exceeds a threshold value.

4. The road vehicle (1) according to claim 1, wherein the control unit (26) is configured to deactivate the electronic DC-DC power converter (23) as soon as the internal combustion engine (5) is started.

5. The road vehicle (1) according to claim 1, wherein the control unit (26) is configured to close a protection contactor (25) of the first storage system (14) in case of the cold-start condition of the internal combustion engine (5) as soon as the turned-on condition of the road vehicle (1) is detected.

6. The road vehicle (1) according to claim 5, wherein the control unit (26) is configured to open the protection contactor (25) of the first storage system (14) after a predetermined amount of time has elapsed since the protection contactor (25) was closed without requests for a start of the internal combustion engine (5).

7. A method to control a road vehicle (1) comprising an internal combustion engine (5);

an electric starter motor (20), which is coupled to the internal combustion engine (5) and can be operated to start the internal combustion engine (5);

a high-voltage electric circuit (16) provided with a first storage system (14);

a low-voltage electric circuit (17) provided with a second storage system (24), which has the same nominal voltage as the electric starter motor (20) and is directly connected to the electric starter motor (20) to directly supply power to the electric starter motor (20) without the interposition of any conversion device; and an electronic DC-DC power converter (23), which connects the low-voltage electric circuit (17) and the high-voltage electric circuit (16) to one another in order to transfer power from the high-voltage electric circuit (16) to the low-voltage electric circuit (17);

wherein the method comprises:

detecting a turned-on condition of the road vehicle (1) when a driver turns on the road vehicle (1), thus making the road vehicle (1) ready for the start of the internal combustion engine (5), by turning an ignition key or by pressing a start button;

detecting a cold-start condition of the internal combustion engine (5) when a temperature of a cooling liquid in the internal combustion engine is below a predeteermined threshold value;

transferring power from the high-voltage electric circuit (16) to the low-voltage electric circuit (17) using the electronic DC-DC power converter (23) and from the low-voltage electric circuit (17) to the electric starter motor (20) upon detection of the turned-on condition of the road vehicle (1) when the internal combustion engine (5) is off and the cold-start condition of the internal combustion engine (5) is detected;

providing, when the temperature of the cooling liquid in the internal combustion engine is greater than the predetermined threshold value and the cold-start condition of the internal combustion engine (5) is not detected, the power supplied to the electric starter motor (20) is exclusively by the second storage system (24);

activating the electronic DC-DC power converter (23), prior to cranking of the internal combustion engine when the cold-start condition of the internal combustion engine (5) is detected, as soon as the turned-on condition of the road vehicle (1) is detected so that the electronic DC-DC power converter (23) supplies electrical power to the low-voltage electric circuit (17) even before the electric starter motor (20) starts to absorb electrical power; and deactivating the electronic DC-DC power converter (23) after a predetermined amount of time has elapsed since the road vehicle (1) was turned on and the electronic DC-DC power converter (23) was activated without requests for a start of the internal combustion engine (5).

* * * * *